United States Patent [19]

Wood et al.

[11] 4,147,055

[45] Apr. 3, 1979

[54] APPARATUS FOR DETERMINING PROJECTILE POSITION AND BARREL PRESSURE CHARACTERISTICS

[75] Inventors: Stanley E. Wood, Inyokern, Calif.; Kenneth L. Moore, Tallahassee, Fla.; William L. Black, China Lake, Calif.

[73] Assignee: The United States of America as represented by the Secretary of the Navy, Washington, D.C.

[21] Appl. No.: 860,814

[22] Filed: Dec. 15, 1977

[51] Int. Cl.² ............................................... G01L 5/14
[52] U.S. Cl. ..................................................... 73/167
[58] Field of Search ........................ 73/167; 324/178; 102/DIG. 10

[56] References Cited

U.S. PATENT DOCUMENTS

| 53,582 | 4/1866 | Coursey | 102/DIG. 10 |
|---|---|---|---|
| 2,475,387 | 7/1949 | Golden | 73/167 |
| 2,482,184 | 9/1949 | Hoffman et al. | 324/178 |
| 2,641,458 | 6/1953 | Gilvarry | 324/178 |
| 2,820,412 | 1/1958 | Beeuwkes | 102/93 |
| 3,127,768 | 4/1964 | Mason | 73/167 |
| 3,675,030 | 5/1972 | Tanenhaus | 324/178 |

FOREIGN PATENT DOCUMENTS

| 956179 | 1974 | Canada | 102/DIG. 10 |
|---|---|---|---|
| 272954 | 1930 | Italy | 73/167 |

Primary Examiner—S. Clement Swisher
Attorney, Agent, or Firm—R. S. Sciascia; W. Thom Skeer; T. R. Schulte

[57] ABSTRACT

Measurement and correlation of chamber pressure and projectile position data is accomplished using an array of phototransistors, illuminated by collimated light, which phototransistors are sequentially switched off due to the interruption of the collimated light by the passing projectile. Pulses generated thereby may be displayed on an oscilloscope along with the pressure-time trace.

37 Claims, 5 Drawing Figures

APPARATUS FOR DETERMINING PROJECTILE POSITION AND BARREL PRESSURE CHARACTERISTICS

BACKGROUND OF THE INVENTION

1. Field of the Invention

This invention pertains to the fields of ballistics, optics, and electronics. More particularly, this invention relates to the field of propellant evaluation. In still greater particularity, this invention pertains to a device for measuring pressure-travel relationships in a gun system.

2. Description of the Prior art

In order to more fully understood combustion kinetics in gun systems, there is a need to obtain data on relationships between chamber pressure and projectile position. Various methods have been employed to determine certain of the projectile travel data, such as projectile velocity upon exit from the barrel, but there is a long felt need for a device to accurately measure projectile positions and corresponding chamber pressures. Devices have been used to determine the moment that the projectile passes the muzzle, which devices have been triggered by the radiation from gases behind the projectile as it passes the muzzle. Such a device is illustrated in U.S. Pat. No. 3,453,882 granted to Richard D. Kirkendall on 8 July 1969. Yet another device utilizes light reflected from a source on the projectile itself to measure acceleration. Still another method measures barrel velocity by directing light through the barrel and recording images on film. This latter device is illustrated by U.S. Pat. No. 3,019,073 granted to Donald A. Hall on 21 Jan. 1959.

While all of the above devices are satisfactory for their intended purposes, a reliable means for measuring the exact projectile position and relating this position to chamber pressure is needed.

SUMMARY OF THE INVENTION

This invention provides a means for measuring the exact projectile position in a gun system and displaying this position data with corresponding chamber pressure data. Projectile position is determined by an array of phototransistors which are switched off by the projectile as it emerges from the muzzle of the gun thereby sequentially interrupting collimated light incident on the phototransistors. Pulses initiated by the phototransistors may be used to brightness modulate the pressure-time data on an oscilloscope or they may be displayed as a series of pulses on a separate channel.

DESCRIPTION OF THE PREFERRED EMBODIMENT

Figure 1:
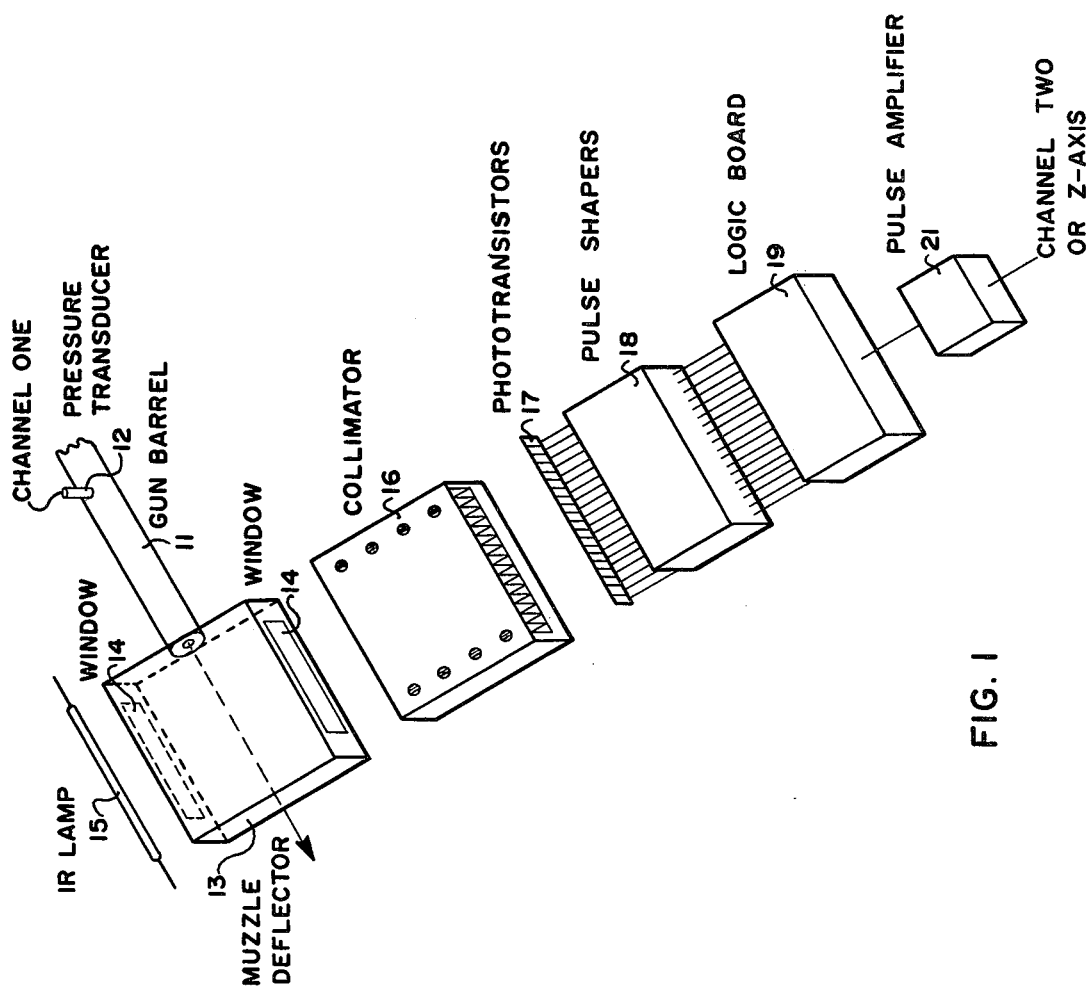
FIG. 1 is the preferred arrangement of the apparatus for measuring projectile position and chamber pressure characteristics.

Referring to FIG. 1, a gun barrel 11 provides a path from which a unique projectile (not shown) is fired. A plurality of pressure transducers 12 measure chamber pressure at the front and rear of the chamber and the data therefrom is transmitted to two channels of an oscilloscope (not shown). Devices measuring chamber pressure, such as that shown in U.S. Pat. No. 3,260,017 granted to Phillip J. Rosen on 12 July 1966, for example, may be adapted for use with this invention to produce the required pressure data.

A muzzle deflector 13, together with a plurality of protective windows 14 mounted thereon, provide protection for a light source 15 and the rest of the apparatus when a projectile is fired from gun barrel 11. Light source 15 emits energy waves in the direction of a collimator 16, which energy waves are interrupted as the projectile passes.

An array of silicon phototransistors 17, mounted on the back of collimator 16 at incremental distances which are of interest detect the energy waves after they are converted to parallel beams by collimator 16. As the light beam incident on each phototransistor 17 is obscured by the passing projectile, phototransistor 17 initiates a pulse to an associated pulse shaper 18. The number of pulse shapers 18 corresponds to the number of phototransistors 17.

The number and spacing of the phototransistors is chosen in accord with the pressure and distances of interest for the particular propellant under test. For example, in a 25 mm gun, employing the unique projectile described herein, with a 90% nitric acid solution as the oxidizer and a suitable hydrocarbon as the fuel, a spacing of 0.1 inch has proven satisfactory. The choice follows good design practice recognizing such engineering trade-offs as cost, size, reliability, and other factors.

The data line from each pulse shaper is connected to a logic board 19 wherein these inputs are combined to form a train of pulses in a single channel. Each pulse in this train of pulses is amplified by a pulse amplifier 21 and subsequently displayed on an oscilloscope (not shown).

Figure 2:
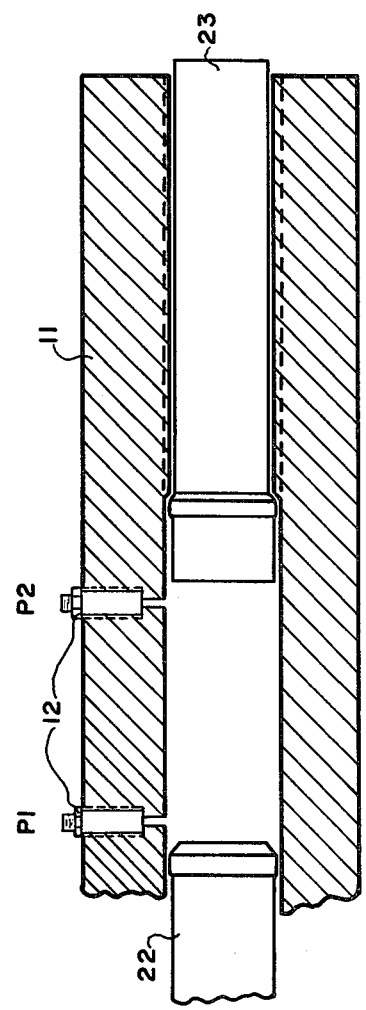
FIG. 2 is a side sectional view of the gun chamber barrel.

Referring to FIG. 2, wherein the gun chamber in barrel 11 is illustrated prior to firing, a bolt 22 protects the injector mechanism from chamber pressure. A projectile 23 extends beyond the muzzle of barrel 11 and pressure transducers 12 measure the pressure at the front and rear of the chamber.

Figure 3:
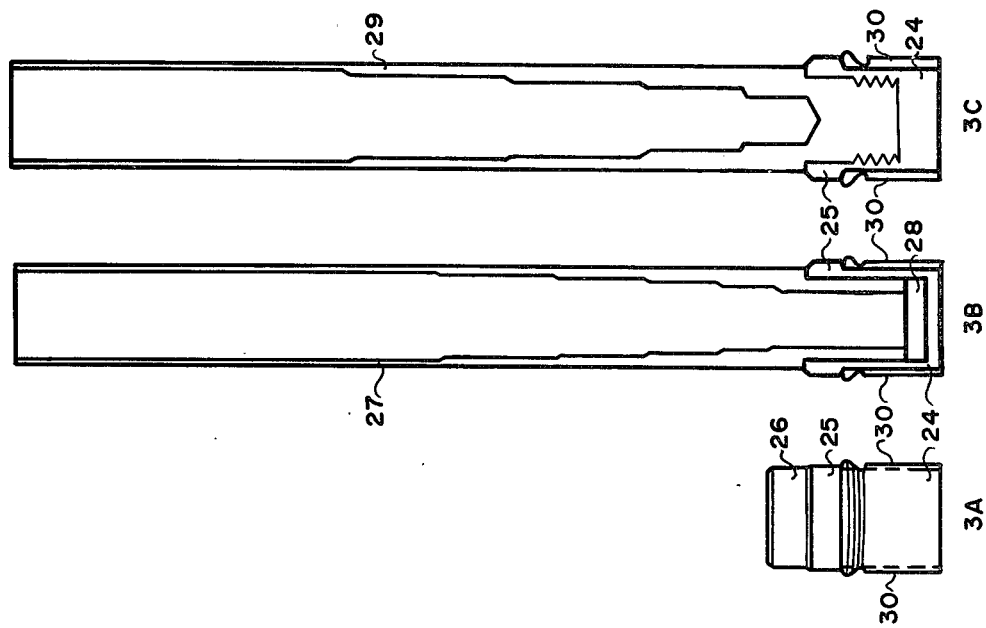
FIG. 3 is a profile of the projectiles. 3A, standard projectile. 3B, projectile with steel extension. 3C, projectile with aluminum extension.

Referring to FIG. 3, the profiles of three projectiles, used as part of the invention, are shown: 3a shows a standard projectile having a foundation such as a brass base 24, an integral engraving band 25, which serves as a means to restrain said combustion forces to said foundation and a nose 26; 3b shows a projectile with brass base 24 having integral engraving band 25, a steel tubular extension 27, and a titanium alloy support disc 38; 3c shows a projectile with brass base 24 having integral engraving band 25, and an aluminum tubular, extension 29. All three projectiles have an elastomer sleeve 30. Elastomer sleeve 30 restrains fluid within the chamber from flowing past projectile 23.

Figure 4:
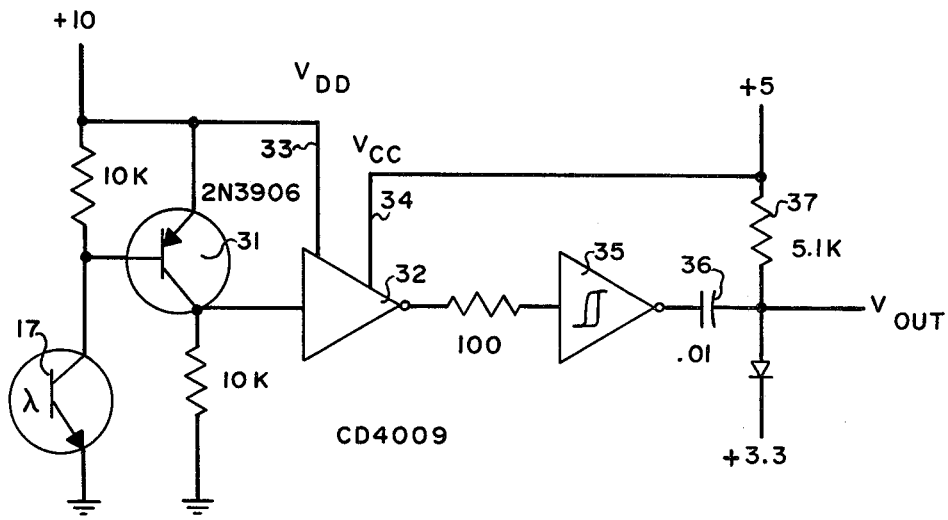
FIG. 4 is a schematic diagram of the level-shift pulse shaping circuitry for each phototransistor.

Referring to FIG. 4, wherein the level-shift pulse shaping circuitry is shown, a light to dark transition voltage from phototransistor 17 causes a transistor 31 to cut off resulting in a drop in the voltage which is fed to an amplifier 32. Amplifier 32 is operated as a level-shift inverter by virtue of having the terminals 33 and 34 connected to differing voltage supplies. The output from amplifier 32 is seen as a level shift which is fed to a Schmitt trigger inverter 35 to produce a negative transition. A capacitor 36 and a resistor 37 form a differentiator to convert the negative level shift transition into a negative going pulse.

Figure 5:
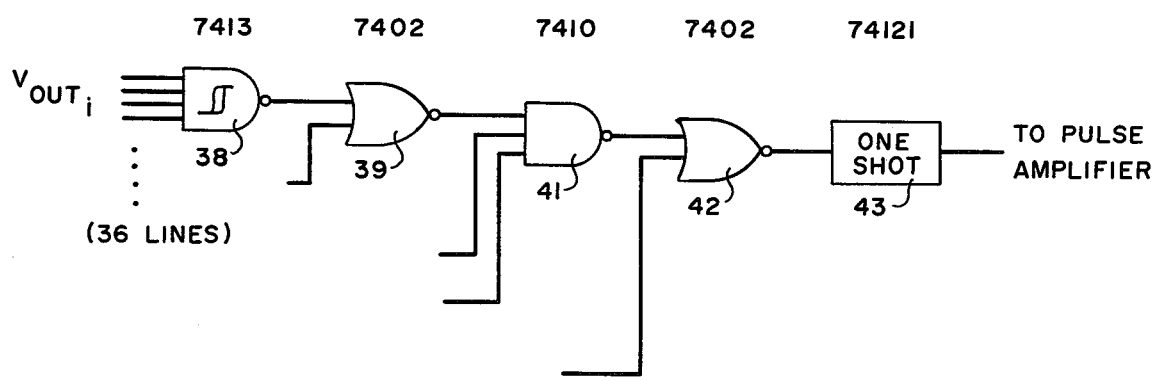
FIG. 5 is a schematic diagram of the logic circuitry.

Referring to FIG. 5 wherein the logic circuitry is illustrated, nine Schmitt trigger NAND gates 38, one 7413 type shown, are connected to provide a fourfold reduction in data lines. This is followed by five NOR gates 39 which may be a type 7402 integrated circuit, two 7410 NAND gates 41, and a 7402 NOR gate 42 which are serially connected to complete the reduction to one data line. Finally, the pulses are converted to six microsecond width by one shot multivibrator 43. This width was found to assure pulse detection on a chopped oscilloscope display.

Mode of Operation

Referring to FIG. 1, a projectile with a tubular extension is fired from a liquid propellant gun with shortened barrel 11. The elongated projectile and the shortened barrel allow immediate measuring of projectile position during the initial period of travel because the projectile extends beyond muzzle of the barrel 11 and immediately upon being put in motion, it interrupts collimated light from source 14.

Referring to FIG. 3, three types of projectiles are shown: 3a is a standard 195 gram projectile; 3b is a projectile with a steel tubular extension; and 3c a projectile with an aluminum tubular extension. All three have brass base 24 with integral engraving band 25 and elastomer sleeve 30.

The projectile in FIG. 3b has a steel tubular extension 27 which is of a weight such that, when the extension is combined with the outer projectile elements, the projectile weight is 195 grams. The outside diameter of the steel extension is approximately the same as the bore of the barrel 11. A titanium alloy support disc 28 was used to distribute the combustion force and to prevent the combustion force from pushing the brass base through the steel extension. Elastomer sleeve 30 is made of material commercially marketed under the trademark VITON. Elastomer sleeve 30 is molded to outside of the base 24 to provide a liquid seal prior to firing. However, other similar material may be used if desired.

The projectile in FIG. 3c has a aluminum tubular extension 29, which is of an weight such that, when combined with the other projectile elements, the total projectile weight is 195 grams. The outside diameter of the aluminum tubular extension is approximately the same as the bore of the barrel 11. A support disc is unnecessary for the aluminum extension. Elastomer sleeve 30, as described above, was used to provide a liquid seal around the outside of the base 24.

Referring to FIG. 1, phototransistors 17 are triggered by collimated light from source 15. Collimator 16 is comprised of two aluminum blocks and two flat plates. Each block has a series of spaced channels which are roughened and coated with carbon black to minimize the solid angle perceived by phototransistors 17. A similar coating of carbon black is applied to the muzzle of barrel 11 to reduce reflected light. The spacing of the collimator channels corresponds to the phototransistor spacing and thus to the desired travel increment measurements. The two blocks are joined together with one plate between the blocks and one plate on the front facing light source 15. The plates have holes drilled in them corresponding to the channels in the blocks. The plate on the front of collimator 16 has larger holes than the other plate in order to allow more light to pass through. The plate between the blocks has smaller holes, approximately 0.8 millimeters, to parallelize the light incident on phototransistors 17. A chopper wheel (not shown) mounted on top of muzzle deflector 14 is used to check collimator-light source-detector alignment prior to each shot and phototransistor operability following each shot.

Light source 15 may be any conventional source of optical wave energy to which photodetectors 17 respond. In the illustrated embodiment, an incandescent lamp of the tungsten-iodine type provides infrared wave energy in the detecting range of phototransistors 17. Other light sources may be used, however.

Referring to FIG. 1, phototransistors 17 provide the detection means to determine projectile position. Silicon phototransistors are packaged paper tape readers and are spaced at the desired position detection increments. The paper tape readers containing phototransistors are themselves contained in fourteen pin dual-in-line packages and plugged into integrated circuit sockets mounted on a piece of perforated breadboard. The entire phototransistor assembly is then mounted on the back of collimator 16.

Referring to FIG. 1, to increase the accuracy of the position data, level-shift pulse shaping circuitry 18 is employed. Referring to FIG. 4, phototransistors 17 are loaded by a resistor connected to a voltage supply. Since the time required for a projectile to pass a photodector is, at lower velocity, essentially equal to the rise time of the state transistion, the problem of interface is one of shifting the phototransistor pulses downward to levels compatible with transistor to transistor logic integrated circuits.

Because the phototransistor potential rises linearly as the projectile obscures the incident light, a degree of pulse triggering variability may be introduced if signals are taken from the leading edge of the transition waveform. To eliminate this, a secondary pulse is triggered only when light incident on the phototransistor 17 is completely obscured by the projectile.

Referring to FIG. 4, transistor 31 gives an abrupt transition when phototransistor 17 is totally obscured by the projectile and thus reaches its maximum voltage. The abrupt transition causes transistor 31 to cut off resulting in a drop in voltage at input to the amplifier 32. Amplifier 32 is operated as a level-shift inverter by connecting terminals 33 and 34 to differing voltages. The output from amplifier 32 is then a level shift triggering a negative transition in the Schmitt trigger inverter 35. The final output is a short pulse having a duration determined by capacitor 36 and resistor 37. This required duration is dictated by the necessity of insuring that the pulse, initiated by a given photransistor, is completed before the next pulse is received.

The pulses generated by the phototransistors 17 are combined in logic board 19, previously described, to form a series of pulses in one channel. The pulses are each converted to a six (6) microsecond width which was found to assure pulse detection on a chopped oscilloscope display.

From the logic board the pulses are sent to pulse amplifiers 21 to be transmitted to the oscilloscope through a coaxial cable. An identical amplifier is used to drive the oscilloscope display if it is desired to observe pressure and position data separately. The pressure data is transmitted by pressure transducers 12, at the front and rear of the chamber, to two channels of the oscilloscope. For z axis modulation of the pressure traces, a pulse generator operating in a triggered mode is used to generate the high voltage pulses necessary for beam intensity modulation.

Among the advantages of the present invention over conventional techniques is the elimination of the electrical noise and sensor replacement or repair. Compact packaging permits the entire apparatus to be mounted on the gun test fixture. In addition, a precise resolution not to be had from available interferometry techniques is achieved. By not employing elements which require structural modification of the gun barrel, the problem of barrel splitting is eliminated. An additional benefit derived by use of the elongated projectile is the prevention of premature triggering of phototransistors 17 by the combustion gases since the gases must pass the engraving band and travel the extra distance to the nose of the projectile extension before they can interfere. Elimination of this false triggering increases the accuracy of this invention as compared with conventional apparatus.

Obviously, many modifications and variations of the present invention are possible in light of the above teachings and it is therefore understood that, within the scope of the disclosed inventive concept, the invention may be practiced otherwise than specifically described.

What is claimed is:

1. A physical pressure instrument for measuring pressure-travel relationships comprising:

barrel means having a finite bored length communicating with a chamber at one end and open at the opposite end for establishing the direction of travel of a projectile;

a projectile contained in said bore of said barrel means for establishing a measurable position point, said projectile including a base, an engraving band attached to said base so as to be an integral part of said base, an extension having an end joined to said base, and a sealant circumferentially surrounding said base;

optical means positioned with respect to the open end of said barrel means for providing measurable wave energy to establish a datum plane which datum plane is perpendicular to said direction of travel;

detector means positioned in said datum plane at the open end of said barrel means for measuring said wave energy incident thereon;

pressure measuring means located in said barrel means for determining pressure at selected points along said barrel means; and read out means effectively connected to said pressure measuring means and said detector means for displaying position and pressure data, said read out means includes:

pulse shaping circuitry for producing a level pulse; and a logic board electrically connected to said pulse shaping circuitry for converting said level pulses into a series of pulses in a single channel.

2. A physical pressure instrument according to claim 1, wherein said barrel means comprises a barrel of a length such that said projectile means extends from said chamber to beyond said open end of said barrel means.

3. A physical pressure instrument according to claim 1 wherein said optical means comprises:

a muzzle deflector comprising a box having two opposing open ends, a top and a bottom and two sides, which deflector is positioned at the open end of said barrel means such that, said projectile means, when expelled from the open end of said barrel means, may pass through said muzzle deflector;

a lamp, positioned on one side of said deflector such that energy waves emitted from said lamp are incident on said one side of said deflector;

protective windows, mounted on the sides of said muzzle deflector, such that, the energy waves emitted from said lamp may pass through said windows and said deflector in order that said energy waves may perpendicularly intersect the path of said projectile; and a collimator positioned on the opposite side of said deflector from said lamp such that said collimator receives the energy waves incident from said lamp exiting said windows.

4. A physical pressure instrument according to claim 3 wherein said lamp comprises an incandescent lamp.

5. A physical pressure instrument according to claim 4 wherein said incandescent lamp comprises a tungsten iodine lamp.

6. A physical pressure instrument according to claim 1 wherein said detector means includes photodetectors.

7. A physical pressure instrument according to claim 6 wherein said photodetectors include phototransistors spaced at predetermined position detection increments.

8. A physical pressure instrument according to claim 7 wherein said phototransistors include silicon phototransistors.

9. A physical pressure instrument according to claim 1 wherein said pulse shaping circuitry includes transistors, amplifiers, diodes, integrated circuits, and voltage sources in circuit configuration with a suitable resistance and capacitance network to produce a predetermined pulse duration.

10. A projectile for use in barrelled firearms possessing a barrel with a chamber and a muzzle, said projectile comprising:

a cylindrical foundation having a closed end to receive propelling forces which move said projectile along the barrel of said barrelled firearm, said cylindrical foundation also having an open end opposite said closed end and extending along the interior of said barrel;

restraining means attached to said cylindrical foundation forward of said closed end for preventing flow of fluid past said projectile along said barrel to thereby confine the propelling forces to the closed end of said foundation; and extension means fixedly attached to said foundation means for increasing the length of said projectile, said extension means having a cylindrical shape and extending forward along the interior of the barrel of said barrelled firearm having a diameter which substantially fills the barrel and a length which extends beyond said muzzle when said foundation means is in said chamber.

11. A projectile according to claim 10 wherein said restraining means includes:

an engraving band extending radially outward from and passing circumferentially about said cylindrical foundation and dimensioned to engage the barrel to prevent the flow of gaseous fluid past said projectile; and an elastomer sleeve covering the closed end of said cylindrical foundation and positioned adjacent to said engraving band toward said closed end of said cylindrical foundation and dimensioned to engage the barrel to prevent the flow of liquid fluid past said projectile.

12. A projectile according to claim 10 wherein said restraining means comprises a brass engraving band, joined to said cylindrical foundation so as to be an integral part thereof, said engraving band circumferentially surrounding said foundation means.

13. A projectile according to claim 12 wherein the aforesaid foundation is made of brass.

14. A projectile according to claim 13 wherein the aforesaid restraining means includes an elastomer seal circumferentially surrounding said foundation between said closed end and the aforesaid engraving band.

15. A projectile according to claim 10 wherein said extension means comprises:

a hollow, steel tube having one end joined to said foundation; and a support disc positioned between said extension and said cylindrical foundation.

16. A projectile according to claim 10 wherein said extension means comprises a hollow aluminum tube having one end joined to said cylindrical foundation.

17. A physical pressure instrument for measuring pressure-travel relationships comprising:

barrel means having a finite bored length communicating with a chamber at one end and open at the opposite end for establishing the direction of travel of a projectile;

projectile means contained in said bore of said barrel means for establishing a measurable position point, said projectile means including:
a brass base,
a brass engraving band formed so as to be an integral part of said brass base,
a steel tube with an outside diameter equal to that of the base of said barrel means and joined to said brass base, said tube and base having a combined length in excess of said bored length of said barrel means,
a titanium alloy support disc positioned between said base and said tubular extension, and
a liquid sealant providing a seal between said barrel means and said brass base;

optical means positioned with respect to the open end of said barrel means for providing measurable wave energy to establish a datum plane which datum plane is perpendicular to said direction of travel;

detector means positioned in said datum plane at the open end of said barrel means for measuring said wave energy incident thereon;

pressure measuring means located in said barrel means for determining pressure at selected points along said barrel means; and readout means effectively connected to said pressure measuring means and said detector means for displaying position and pressure data, said readout means includes:
pulse shaping circuitry for producing a level pulse; and a logic board electrically connected to said pulse shaping circuitry for converting said level pulses into a series of pulses in a single channel.

18. A physical pressure instrument according to claim 17 wherein said optical means comprises:

a muzzle deflector having two sides, and positioned at the open end of said barrel means such that said projectile means may pass through said muzzle deflector;

a lamp, positioned adjacent to one side of said deflector such that energy waves emitted from said lamp are incident on said one side of said deflector;

protective windows, mounted on the two sides of said muzzle deflector such that the energy waves emitted from said lamp may pass through said windows and said deflector to intersect the path of said projectile as it passes through said deflector; and a collimator positioned on the opposite side of said deflector from said lamp and in alignment with said protective windows such that said collimator receives the energy waves incident from said lamp exiting said protective windows.

19. A physical pressure instrument according to claim 18 wherein said lamp comprises a tungsten iodine lamp.

20. A physical pressure instrument according to claim 17 wherein said detector means includes photodetectors.

21. A physical pressure instrument according to claim 20 wherein said photodetectors include phototransistors spaced at predetermined position detection increments.

22. A physical pressure instrument for measuring pressure-travel relationships comprising:

barrel means having a finite bored length communicating with a chamber at one end and open at the opposite end for establishing the direction of travel of a projectile;

projectile means contained in said bore of said barrel means for establishing a measurable position point wherein said projectile means includes:
a brass base,
a brass engraving band formed so as to be an integral part of said brass base,
an aluminum tube with an outside diameter equal to that of the bore of said barrel means and joined to said brass base, said tube and base having a combined length in excess of said bored length of said barrel means, and
a liquid sealant providing a seal between said barrel means and said brass base;

optical means positioned with respect to the open end of said barrel means for providing measurable wave energy to establish a datum plane which datum plane is perpendicular to said direction of travel;

detector means positioned in said datum plane at the open end of said barrel means for measuring said wave energy incident thereon;

pressure measuring means located in said barrel means for determining pressure at selected points along said barrel means; and readout means effectively connected to said pressure measuring means and said detector means for displaying position and pressure data, said readout means includes:
pulse shaping circuitry for producing a level pulse; and a logic board electrically connected to said pulse shaping circuitry for converting said level pulses into a series of pulses in a single channel.

23. A physical pressure instrument according to claim 22 wherein finite bored length of said barrel means is such that said projectile means extends from said chamber to beyond said open end of said barrel means.

24. A physical pressure instrument according to claim 22 wherein said optical means comprises:
   a muzzle deflector comprising a box having two opposing open ends and two sides, said muzzle deflector being positioned at the open end of said barrel means such that, said projectile means, when expelled from the open end of said barrel means, passes through said muzzle deflector via the open ends thereof;
   a lamp, positioned with respect to one side of said deflector such that energy waves emitted from said lamp are incident on said one side of said deflector;
   protective windows, mounted on the sides of said muzzle deflector in optical alignment with said lamp, such that, the energy waves emitted from said lamp may pass through said windows and said deflector in order that said energy waves may intersect the path of said projectile; and
   a collimator positioned on the opposite side of said deflector from said lamp and in optical alignment with said windows such that said collimator receives the energy waves incident from said lamp exiting said windows.

25. A physical pressure instrument according to claim 22 wherein said optical means comprises a tungsten iodine lamp.

26. A physical pressure instrument according to claim 22 wherein said detector means includes a plurality of phototransistors spaced at predetermined position detector increments.

27. A physical pressure instrument according to claim 26 wherein said phototransistors are silicon phototransistors.

28. An apparatus for obtaining pressure travel relationships comprising:
   a chamber;
   a barrel of fixed length attached at one end to said chamber and open at the other end;
   a pressure sensing means located in said barrel for measuring pressure data in said barrel;
   a projectile means, inserted in said barrel and extending beyond said barrel, for establishing a measurable position point;
   an optical detector means, which emits measurable wave energy, located at the open end of said barrel and perpendicular to said barrel for establishing the position of said projectile; and
   an electronic readout means for obtaining pressure-distance relationships which includes:
      an energy sensing means for measuring said wave energy;
      position circuit means connected to said energy sensing means for converting said wave energy into electronic signals, said electronic signals representing distance traveled by said projectile;
      pressure circuit means connected to said pressure sensing means for converting said pressure data into electronic signals; and
      a data display means connected to said position circuit means and said pressure circuit means for displaying said pressure and distance traveled data.

29. An apparatus for obtaining pressure travel relationships according to claim 28 wherein said pressure sensing means comprises:
   a plurality of pressure transducers for measuring the pressure inside said chamber.

30. An apparatus for obtaining pressure travel relationship according to claim 28 wherein said projectile means comprises:
   a base;
   an engraving band attached to said base so as to be an integral past of said base;
   an extension having one end joined to said base; and
   a sealant circumferentially surrounding said base.

31. An apparatus for obtaining pressure travel relationship according to claim 28 wherein said projectile means comprises:
   a brass base;
   a brass engraving band formed so as to be an integral part of said brass base;
   a steel tube with an outside diameter equal to that of the base of said barrel means and joined to said brass base, said tube and base having a combined length in excess of said bored length of said barrel means;
   a titanium alloy support disc positioned between said base and said steel tube; and
   a liquid sealant providing a seal between said barrel means and said brass base.

32. An apparatus for obtaining pressure travel relationship according to claim 28 wherein said projectile means comprises:
   a brass base;
   a brass engraving band formed so as to be an integral part of said brass base;
   an aluminum tube with an outside diameter equal to that of the bore of said barrel means and joined to said brass base, said tube and base having a combined length in excess of said bored length of said barrel means; and
   a liquid sealant providing a seal between said barrel means and said brass base.

33. An apparatus for obtaining pressure travel relationship according to claim 28 wherein said optical detection means comprises:
   a muzzle deflector comprising a box having two opposing open ends and two sides, which deflector is positioned at the open end of said barrel means such that, said projectile means, when expelled from the open end of said barrel means, may pass through said muzzle deflector;
   a lamp, positioned on one side of said deflector such that energy waves emitted from said lamp are incident on said one side of said deflector;
   protective windows, mounted on the sides of said muzzle deflector such that the energy waves emitted from said lamp may pass through said windows and said deflector in order that said energy waves may perpendicularly intersect the path of said projectile; and
   a collimator positioned on the opposite side of said deflector from said lamp such that said collimator receives the energy waves incident from said lamp exiting said windows.

34. An apparatus for obtaining pressure travel relationship according to claim 28 wherein said energy sensing means comprises a plurality of phototransistors spaced at predetermined position detection increments.

35. An apparatus for obtaining pressure travel relationship according to claim 28 wherein said position circuit means comprises:
   a plurality of analog circuits having inputs connected to said energy sensing means for producing a logic pulse output; and
   a digital circuit having inputs connected to said analog circuits for receiving said logic pulses.

36. An apparatus for obtaining pressure travel relationship according to claim 35 wherein said analog circuit includes:
   a transistor having a base and a collector, the base of said transistor connected to said energy sensing means;
   an amplifier, the input of said amplifier connected to the collector of said transistor;
   a Schmitt trigger having an input connected to the output of said amplifier; and
   a resistor capacitor network having an input connected to the output of said Schmitt trigger and an output providing a logic level pulse.

37. An apparatus for obtaining pressure travel relationship according to claim 35 wherein said digital circuit includes:
   a plurality of Schmitt trigger Nand gates connected to the outputs of said analog circuits;
   a gating circuit connected to the outputs of said Schmitt trigger Nand gates for reducing said logic level pulses to a single train of pulses; and
   a one shot multivibrator connected to the output of said gating circuit for expanding the pulse width of said logic level pulses.

* * * * *